(12) United States Patent
Doria

(10) Patent No.: US 9,734,741 B2
(45) Date of Patent: Aug. 15, 2017

(54) HUNTER SAFETY FLAGPOLE

(71) Applicant: Trilogy Targets Creations, Ltd., Oregon, OH (US)

(72) Inventor: Michael Doria, Oregon, OH (US)

(73) Assignee: Trilogy Targets Creations, Ltd., Oregon, OH (US)

(*) Notice: Subject to any disclaimer, the term of this patent is extended or adjusted under 35 U.S.C. 154(b) by 221 days.

(21) Appl. No.: 14/724,931

(22) Filed: May 29, 2015

(65) Prior Publication Data

US 2015/0364067 A1 Dec. 17, 2015

Related U.S. Application Data

(60) Provisional application No. 62/013,063, filed on Jun. 17, 2014.

(51) Int. Cl.
*G09F 17/00* (2006.01)
*A01M 31/02* (2006.01)
*G08B 5/00* (2006.01)

(52) U.S. Cl.
CPC .......... *G09F 17/00* (2013.01); *A01M 31/025* (2013.01); *G08B 5/00* (2013.01); *G09F 2017/0083* (2013.01)

(58) Field of Classification Search
CPC ... G09F 17/00; G09F 2017/0083; G08B 5/00; A01M 31/025
USPC .............. 116/173, 28 R, 209, 175; 33/679.1; 182/20, 187; 359/854; 135/90; 40/610
See application file for complete search history.

(56) References Cited

U.S. PATENT DOCUMENTS

| | | | |
|---|---|---|---|
| 492,229 A | 2/1893 | Piper | |
| 760,306 A * | 5/1904 | Chase | E04H 15/32 135/114 |
| 881,690 A | 3/1908 | Horan | |
| 1,002,260 A * | 9/1911 | Golden | B61L 5/125 116/173 |
| 1,133,583 A | 3/1915 | Simmons | |
| 1,755,577 A | 4/1930 | Frost | |
| 3,792,680 A | 2/1974 | Allen | |
| 4,071,970 A | 2/1978 | Strizki | |
| 4,173,086 A * | 11/1979 | Hempfling | G09F 7/18 40/607.03 |
| 4,249,715 A * | 2/1981 | Repp | E01F 9/685 248/156 |
| 4,662,305 A | 5/1987 | Cline | |
| 4,686,785 A * | 8/1987 | Obbermito | E01F 9/669 40/583 |
| 4,790,092 A * | 12/1988 | Farmer | G09F 7/18 40/606.19 |
| 4,864,757 A * | 9/1989 | Lovett | G09F 7/18 24/561 |
| 5,103,582 A * | 4/1992 | Farmer | G09F 15/00 40/607.03 |
| 5,181,335 A | 1/1993 | Todd | |
| 5,340,065 A | 8/1994 | Thomas | |
| 5,368,127 A * | 11/1994 | Phillips | E06C 1/381 182/100 |

(Continued)

*Primary Examiner* — R. A. Smith
*Assistant Examiner* — Tania Courson
(74) *Attorney, Agent, or Firm* — Ward Law Office LLC; Jacob M. Ward

(57) ABSTRACT

A flagpole has a main support with an indicator flag coupled thereto. The flagpole includes first securement means disposed on the main support and configured for anchoring the flagpole to a ground surface. The flagpole also includes a second securement means coupled to the main support and configured for anchoring the flagpole to a tree.

16 Claims, 8 Drawing Sheets

(56) References Cited

U.S. PATENT DOCUMENTS

| | | | |
|---|---|---|---|
| 5,408,782 A | 4/1995 | McConnell | |
| 5,502,910 A * | 4/1996 | Lucchesi | G09F 7/22 |
| | | | 173/91 |
| 6,015,122 A * | 1/2000 | Qui | E01F 9/685 |
| | | | 248/156 |
| 6,557,482 B1 * | 5/2003 | Doty, III | A01M 29/06 |
| | | | 116/150 |
| 6,811,180 B1 * | 11/2004 | Molliere | A01M 31/006 |
| | | | 182/116 |
| 7,338,048 B1 * | 3/2008 | Hulstine | F41J 1/10 |
| | | | 211/196 |
| 8,424,639 B1 * | 4/2013 | Davis | E06C 1/397 |
| | | | 182/115 |
| 8,485,676 B2 * | 7/2013 | Mccarty, Jr. | G02B 5/08 |
| | | | 248/479 |
| 8,608,167 B2 | 12/2013 | Raymond | |
| 9,326,500 B2 * | 5/2016 | Overbaugh | A01M 31/02 |
| 9,390,640 B1 * | 7/2016 | Coleman | E04H 12/2215 |
| 2002/0124975 A1 * | 9/2002 | Kendrick | A01M 31/025 |
| | | | 160/351 |
| 2004/0125477 A1 * | 7/2004 | Carter | A01M 31/00 |
| | | | 359/881 |
| 2004/0206860 A1 * | 10/2004 | Bolinder | E04H 12/2215 |
| | | | 248/156 |
| 2008/0271948 A1 * | 11/2008 | Motes | A01M 31/02 |
| | | | 182/141 |
| 2009/0013921 A1 * | 1/2009 | Yun | G09F 17/00 |
| | | | 116/173 |
| 2010/0043265 A1 | 2/2010 | Amrani | |
| 2012/0012142 A1 * | 1/2012 | Frady | E04H 15/001 |
| | | | 135/90 |

\* cited by examiner

HUNTER SAFETY FLAGPOLE

CROSS-REFERENCE TO RELATED APPLICATIONS

This application claims the benefit of U.S. Provisional Application No. 62/013,063, filed on Jun. 17, 2014. The entire disclosure of the above application is hereby incorporated herein by reference.

FIELD

The disclosure generally relates to a flagpole for personal safety while hunting and, more particularly, to a hunter flagpole for use with both ground blinds and tree blinds.

BACKGROUND

Typically, hunters use camouflaging techniques in order to blend with the environment and remain undetected by their prey. Such techniques include hunting from tree and/or ground blinds and wearing camouflage attire. However, using these techniques creates an increased risk due to the limited visibility of the hunters. This can lead to injury and possibly even death caused by other hunters.

A multitude of different safety devices are known in the art, such as one-dimensional signs that warn that a hunter is in the area. However, these devices may not adequately remain visible from varying directions and distances. Additionally, hunters may need to walk a required distance to reach a blind, and may move from one blind to another during a course of a hunting excursion. Certain safety devices can be unwieldy or complex to transport and use when traveling from one blind to another.

There is a continuing need for a safety device for hunting that is portable, simple to use, and which contributes to the safety of the hunter while using camouflaging techniques.

SUMMARY

In concordance with the instant disclosure, a flagpole that is portable, simple to use, and which contributes to the safety of the hunter while using camouflaging techniques, is surprisingly discovered.

In one embodiment, a flagpole includes a main support, first securement means, and second securement means. The main support has an indicator such as a flag coupled thereto. The first securement means is disposed on the main support and configured for anchoring the flagpole to a ground surface. The second securement means is coupled to the main support and configured for anchoring the flagpole to a tree.

In another embodiment, a flagpole includes a main support having an indicator coupled thereto, first securement means, and second securement means. The indicator includes a pair of flags selectively positionable at an angle with respect of each other. The first securement means is disposed on the main support and configured for anchoring the flagpole to a ground surface. The first securement means is a ground anchor disposed at a bottom of the main support. The ground anchor has a first stake with a tapered end, and a second stake with a tapered end. A foot member extends outwardly from the main support, and is disposed at a right angle relative to the main support. The foot member connects and spaces apart the first stake and the second stake. The second securement means is coupled to the main support and configured for anchoring the flagpole to a tree. The second securement means includes a plurality of harnesses. Each of the harnesses has a bracket and a strap. The bracket has an elongate member configured to space apart the main support from the tree. The strap is configured to removably secure the bracket to the tree. The strap forms a loop that can be adjusted in circumference by an adjustment feature to removably secure the harness to the tree. Each of the harnesses further has coupling means configured to slidably couple the bracket to the main support.

In a further embodiment, a kit for a flagpole includes a main support, an indicator for removably coupling to a top of the main support, first securement means, and second securement means. The first securement means is configured for removably coupling to a bottom of the main support and for anchoring the flagpole to a ground surface upon assembly of the flagpole. The second securement means is configured for removably coupling to the main support at a location between the top and the bottom of the main support, and for anchoring the flagpole to a tree upon assembly of the flagpole.

DRAWINGS

The above, as well as other advantages of the present disclosure, will become readily apparent to those skilled in the art from the following detailed description, particularly when considered in the light of the drawings described hereafter.

Figure 1:
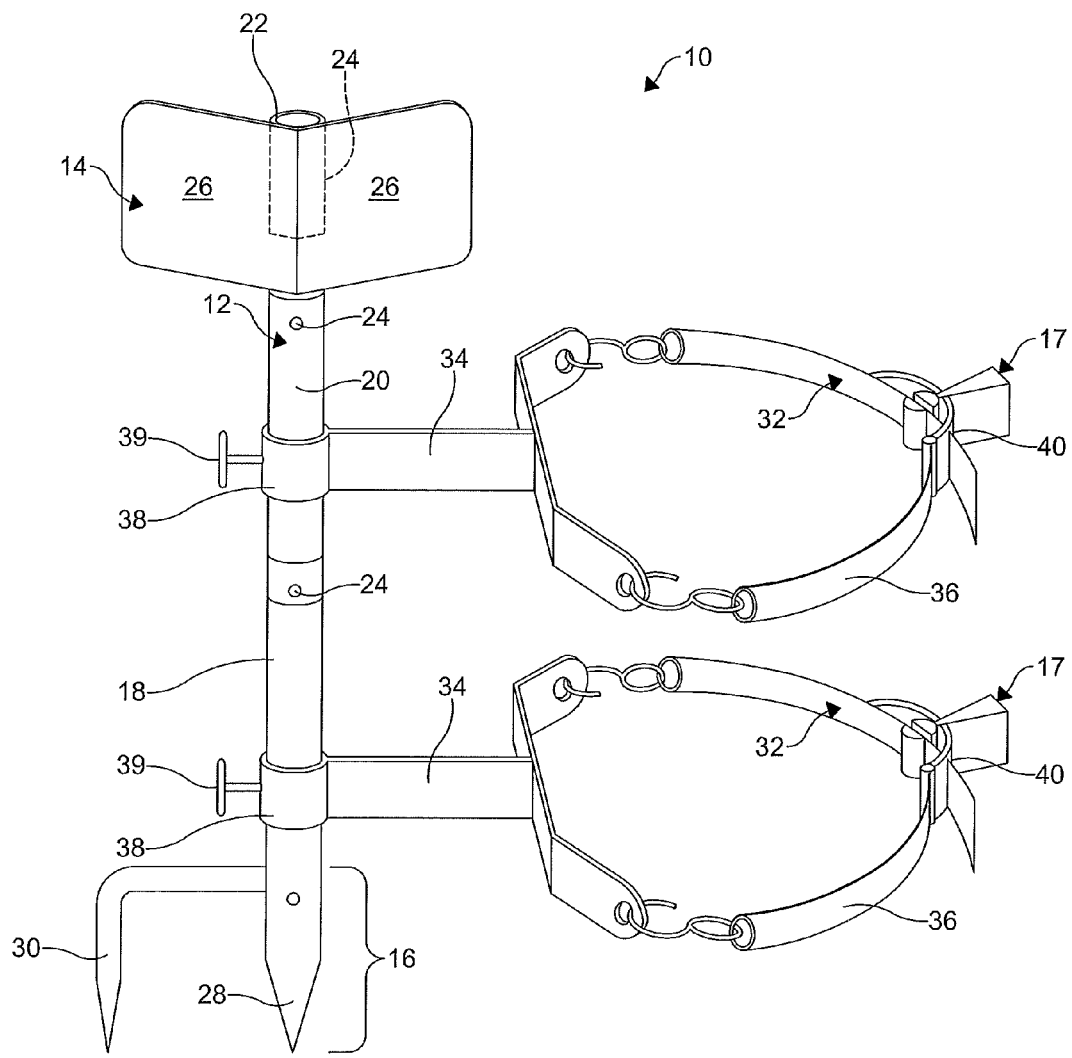
FIG. 1 is a perspective view of a flagpole according to one embodiment of the present disclosure, having a first securement means, a second securement means, and an indicator.
Figure 5A:
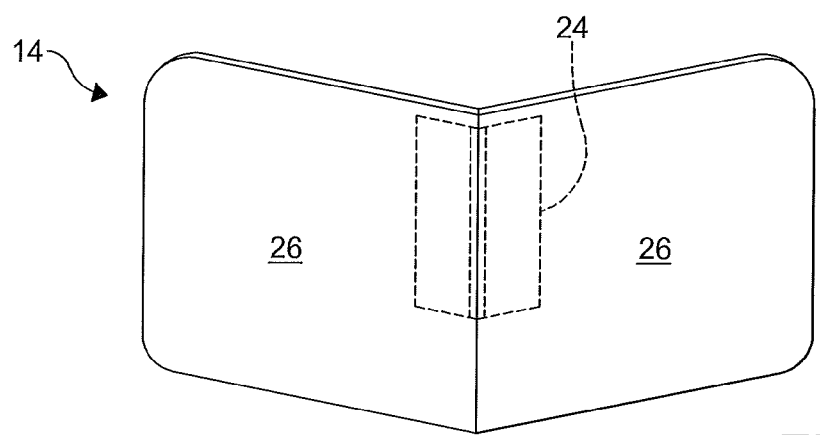
Figure 5B:
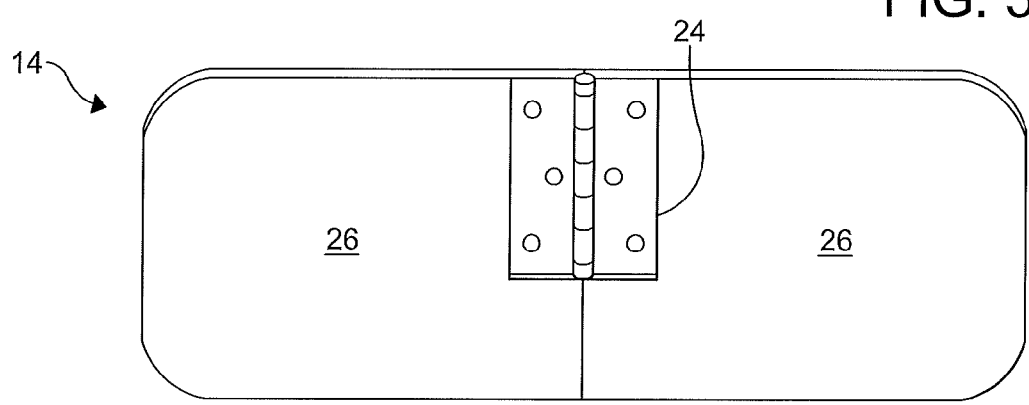
Figure 5C:
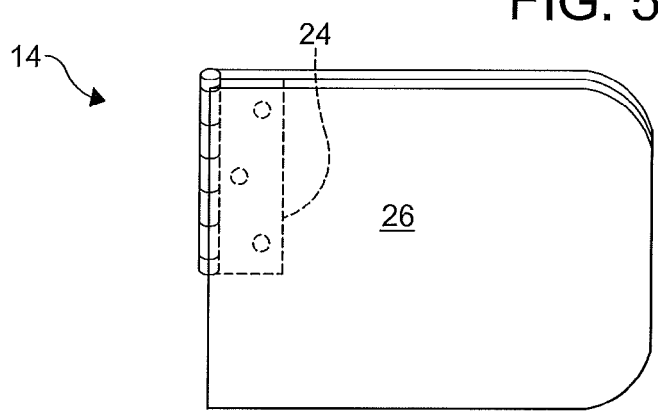
Figure 6:
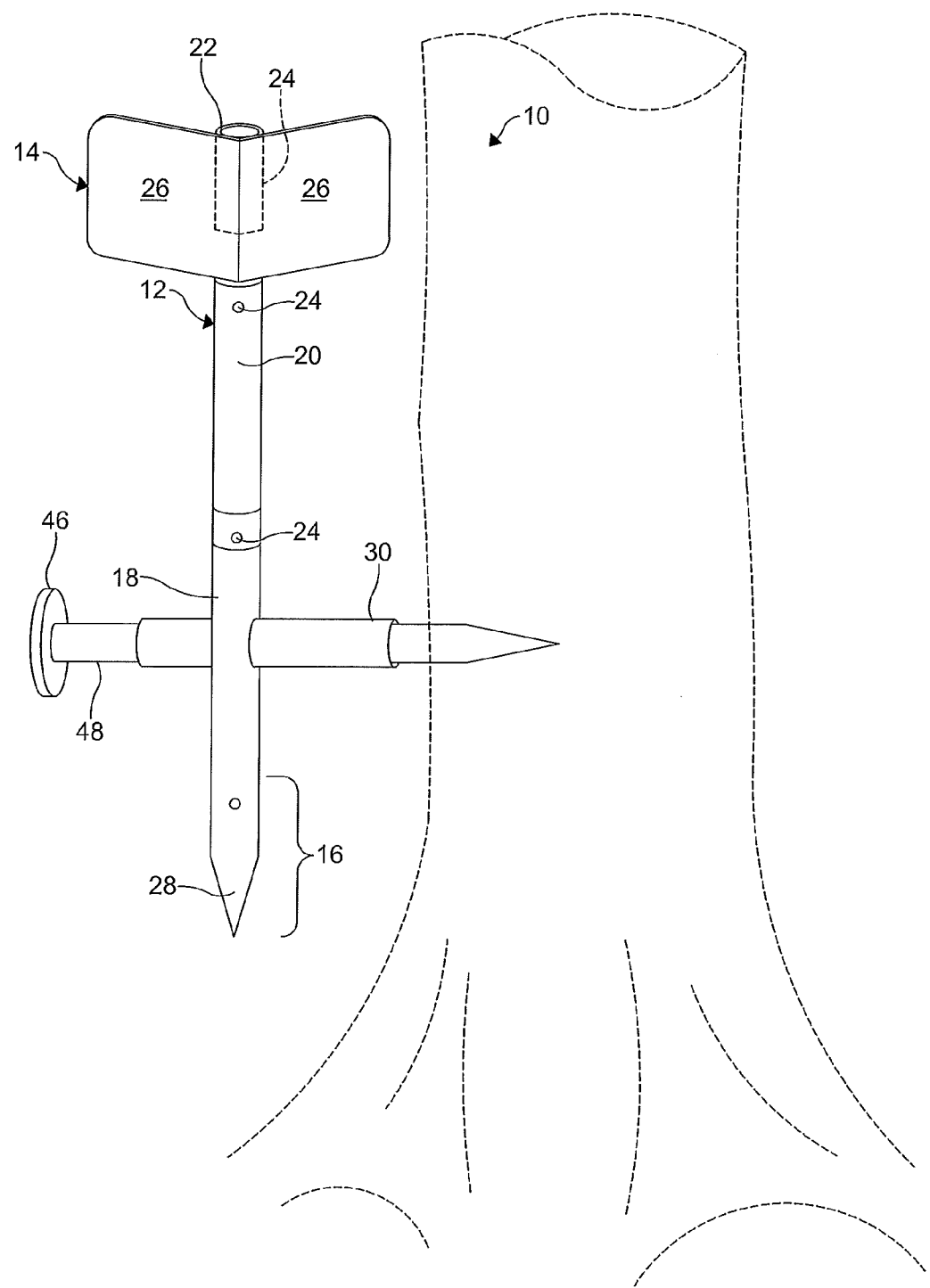
Figure 7:
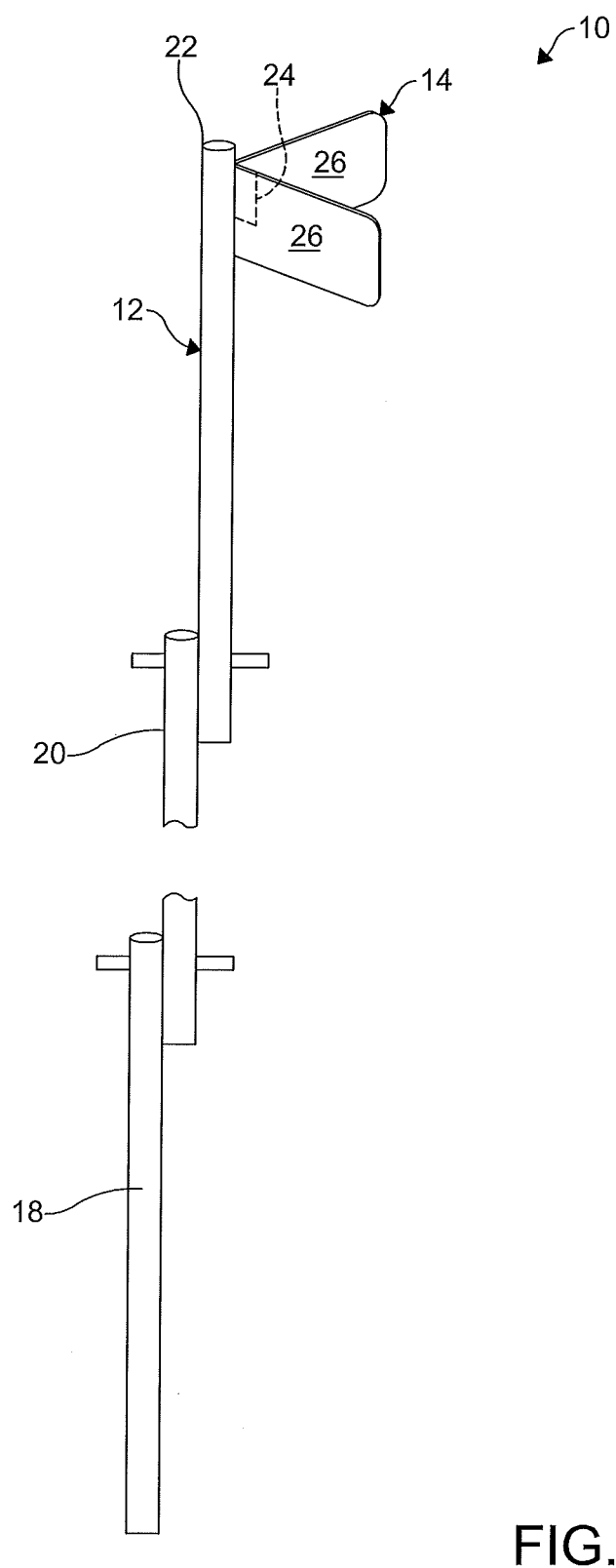
Figure 8:
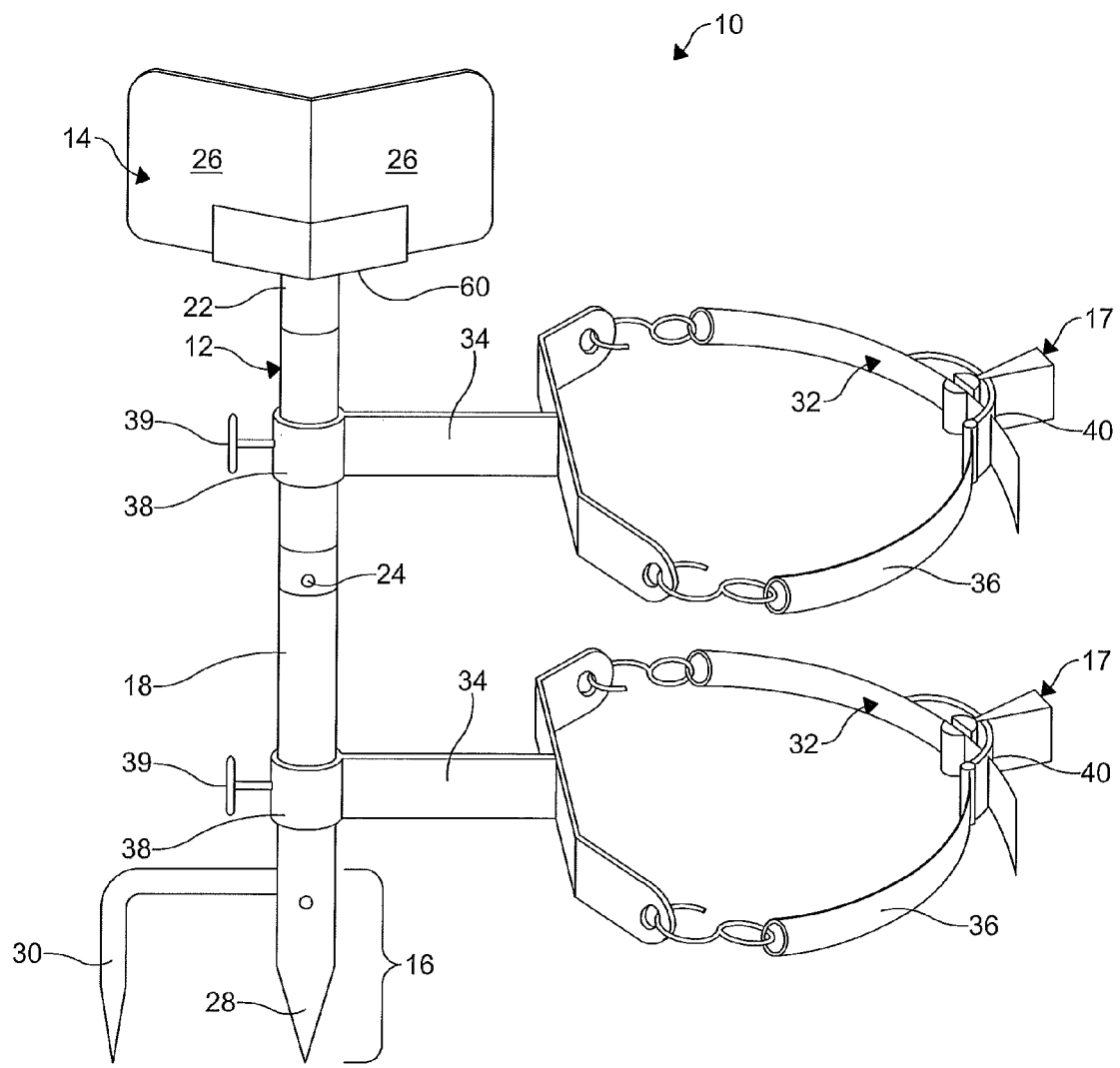

FIGS. 5*a*-5*c* are perspective view of the indicator of the flagpole shown in FIG. 1, shown partly opened in FIG. 5*a*, completed opened in FIG. 5*b*, and completely closed in FIG. 5*c*;

FIG. 6 is a perspective view of a flagpole according to another embodiment of the present disclosure, further depicted in use and staked into a tree;

FIG. 7 is a partial perspective view of a flagpole according to a further embodiment of the present disclosure, the flagpole being collapsible by folding at a plurality of hinge points along the flagpole; and FIG. 8 is a perspective view of a flagpole according to a different embodiment of the present disclosure, the flagpole have a mount with a channel formed at one end for holding an indicator flag.

DETAILED DESCRIPTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

In FIGS. 1-8, a flagpole 10 that is configured for use when hunting to indicate hunters are present in an adjacent location is shown. The flagpole 10 can also be configured for use with other activities, such as other sporting or recreational activities, as desired. The flagpole 10 is also shown in a generally vertical orientation; however, other orientations for the flagpole 10 may also be used within the scope of the disclosure. All dimensions and materials identified are merely illustrative in nature, and should not be considered limiting unless otherwise disclosed.

Figure 2:
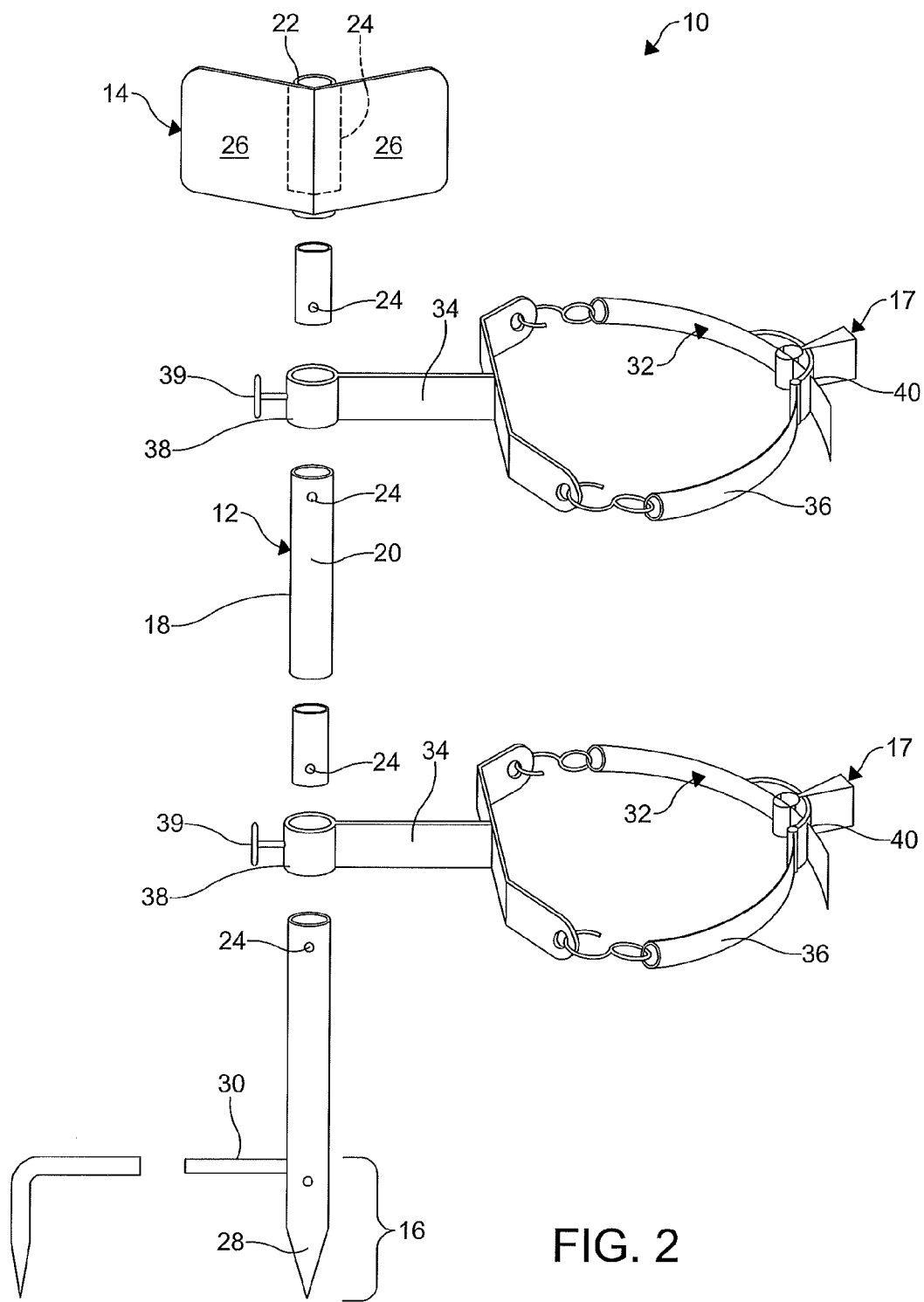
FIG. 2 is an exploded perspective view of the flagpole shown in FIG. 1.

As shown in FIGS. 1-2, the flagpole 10 includes an elongate main support 12, an indicator 14 coupled to the main support 12, a first securement means 16, and a second securement means 17. The main support 12 may be collapsible or readily disassembled to facilitate a portability thereof. In the embodiment illustrated in FIGS. 1-2, the main support 12 is substantially cylindrical and tubular. However, the main support 12 can be substantially rectangular and/or solid, for example. The main support 12 can alternatively be provided as a single unitary piece, not readily disassembled, as desired. Additionally, the main support 12 can be formed from rigid material such as plastic, wood, metal, or a combination thereof.

In certain embodiments, as shown in FIGS. 1-2, the main support 12 is formed by a first segment 18, a second segment 20, and a third segment 22, releasably coupled to each other by coupling means 24. In a non-limiting example, coupling means 24, such as pins received in apertures formed in the segments 18, 20, 22, can be used to secure the segments 18, 20, 22 together. However, other coupling means 24 can be used as desired. For example, coupling means such as clamps or cam and groove systems can be used to couple the segments 18, 20, 22 together. In other non-limiting examples, each of the segments 18, 20, 22 can include threaded portions formed thereon, wherein the segments 18, 20, 22 can threadedly engage with each other or each of the segments 18, 20, 22 can be coupled to each other by a friction fit. The main support 12 can include any number of segments as desired to facilitate portability, such as one, two, four, for example. Advantageously, the segments 18, 20, 22 forming the main support 12 facilitate portability of the flagpole 10.

Other means can be employed as desired to facilitate collapsibility of the main support 12. For example, the main support 12 can be configured to fold upon itself, as shown in FIG. 7. In order for the main support 12 to fold upon itself, each of the segments 18, 20, 22 can be hingedly coupled to each other, with rotatable pins, rods, or the like, as illustrated in FIG. 7.

In other examples, the main support 12 can be configured for telescoping, wherein upper segments 20, 22 can slidingly fit into a lower segment 18 or the lower segments 18, 20 slidingly fit into the upper segment 22, when the flagpole 10 is collapsed. The segments 18, 20, 22 slidingly extend to form the fully extended flagpole 10.

In yet another example, at least one of the segments 18, 20, 22 can include a spring loaded mechanism coupled thereto. This allows the at least one of the segments 18, 20, 22 to retract within, and extend from, an adjacent segment as desired.

With renewed reference to FIGS. 1-2, the indicator 14 is coupled to the main support 12 at an upper portion or a top thereof. The indicator 14 includes a pair of flags 26. The flags 26 are pivotally positionable with respect of each other, for example, with a hinge 24. This permits the flags 26 to be selectively positioned at an angle relative to each other in operation. The flags 26 can be formed from a rigid material such as plastic, wood, or metal, for example, and are weather-resistant. The flags 26 are configured to identify a location of a hunter when in use.

As illustrated in FIGS. 5a-5c, the flags 26 can be positioned in a partly opened position (FIG. 5a), in a fully opened position (FIG. 5b), and a closed position (FIG. 5c). The ability to pivotally position the flags 26 advantageously permits the user of the flagpole 10 to orient the flags 26 in a direction most likely to be seen by other hunters, and thereby maximize the safety of the user while hunting.

In certain embodiments, the flags 26 can be pivotally coupled directly to each other and separately coupled to the main support 12. In other embodiments, each of the flags 26 can be coupled to the main support 12 separately. The coupling means used to couple each of the flags 26 to each other and/or to the main support 12 can include the hinge 24. However, any coupling means can be used such as brackets, clamps, straps, hook and look systems, or any other coupling means as desired.

It should be understood that the indicator 14 can include any number of flags 26 as desired such as one flag, two flags, three flags, four flags, or more than four flags. The indicator 14 can include indicia applied thereto or formed thereon. For example, a high visibility color can be applied to the indicator 14, such as hunter orange. Advantageously, the color orange contrasts with certain hunting environments. However, any color can be used such as red, white, yellow, or pink, for example.

In other examples, the indicator 14 can include letters, numbers, or characters to indicate that a hunter is nearby. In the example shown in FIGS. 5a-5c, the flags 22 have a substantially rectangular shape. The flags 22 can have rounded edges that minimize the opportunity for cutting the user or containers while in storage. However, it should be appreciated that the flags 22 can be any shape as desired, such as triangular or ovular, as non-limiting examples.

Figure 3:
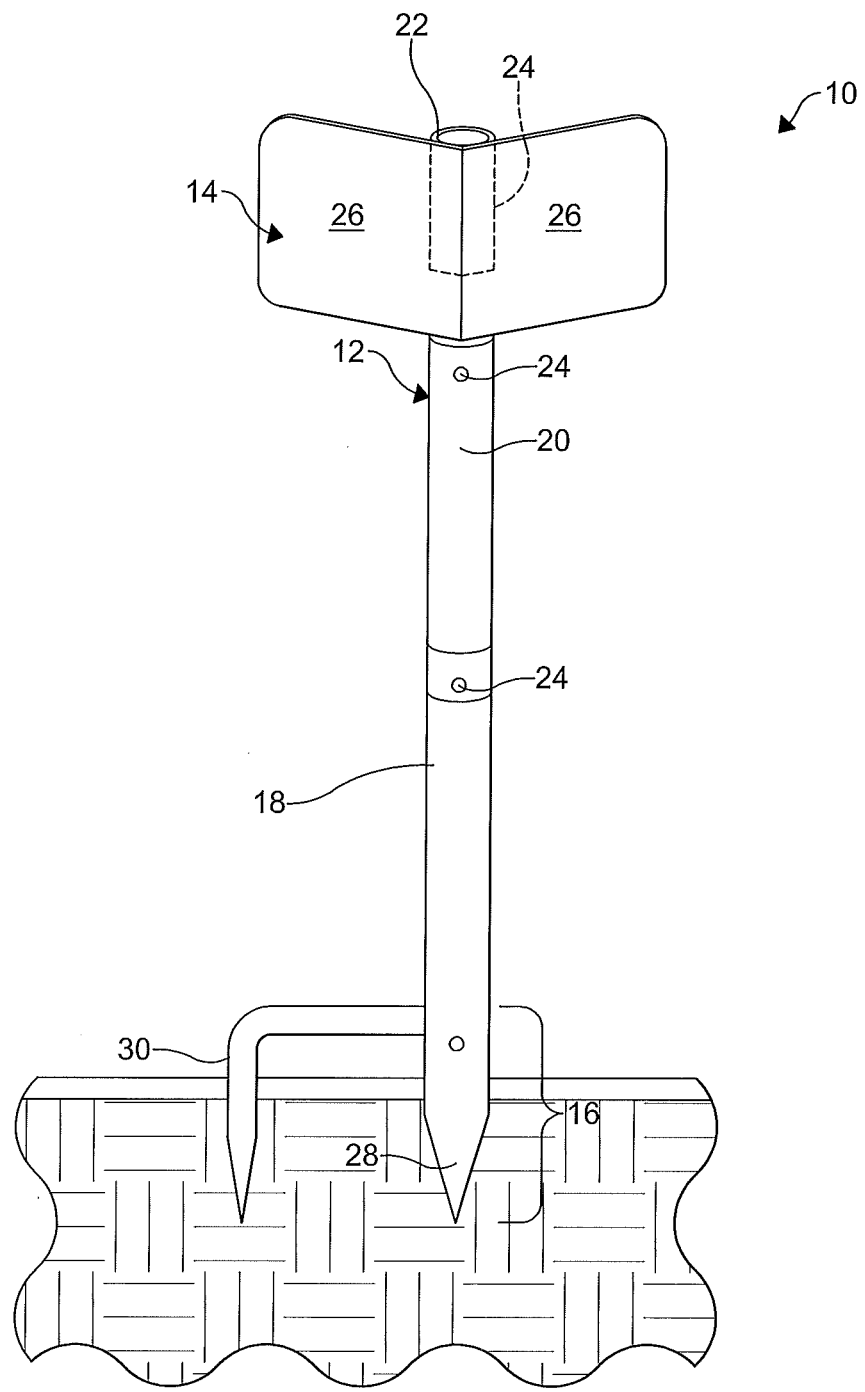
FIG. 3 is a perspective view of the flagpole shown in FIG. 1, and further depicted in use and staked into a ground surface.

As shown in FIGS. 1-2, the first securement means 16 is disposed at a lower portion of the main support 12. The first securement means 16 includes an anchor 28 tapered or otherwise configured to serve as a stake and penetrate a first anchoring point such as the ground or earth, for example, as shown in FIG. 3. In the embodiment illustrated, the anchor 28 is integrally formed with the main support 12. However, the anchor 28 can be separately formed and coupled to the main support 12.

The first securement means 16 can further include a foot member 30 extending outwardly from the main support 12 and disposed at a right angle relative to the main support 12. The foot member 30 can be any rigid material and extends from the main support 12 at a distance configured to receive at least a portion of a foot of a user. In certain embodiments, the foot member 30 can be separately formed and coupled to the main support 12 by any coupling means as desired, such as a pin, screw, bolt, camp, for example. The foot member 30 can also be integrally formed with the main support 12.

The foot member 30 can further include a downwardly-oriented stake portion. This portion can be used to penetrate the ground surface at a position spaced apart from the anchor 28, as also shown in FIG. 3. The employment of the downwardly-oriented stake portion on the foot member 30 can further support the flagpole 10 in a substantially upright position, in operation.

Figure 4:
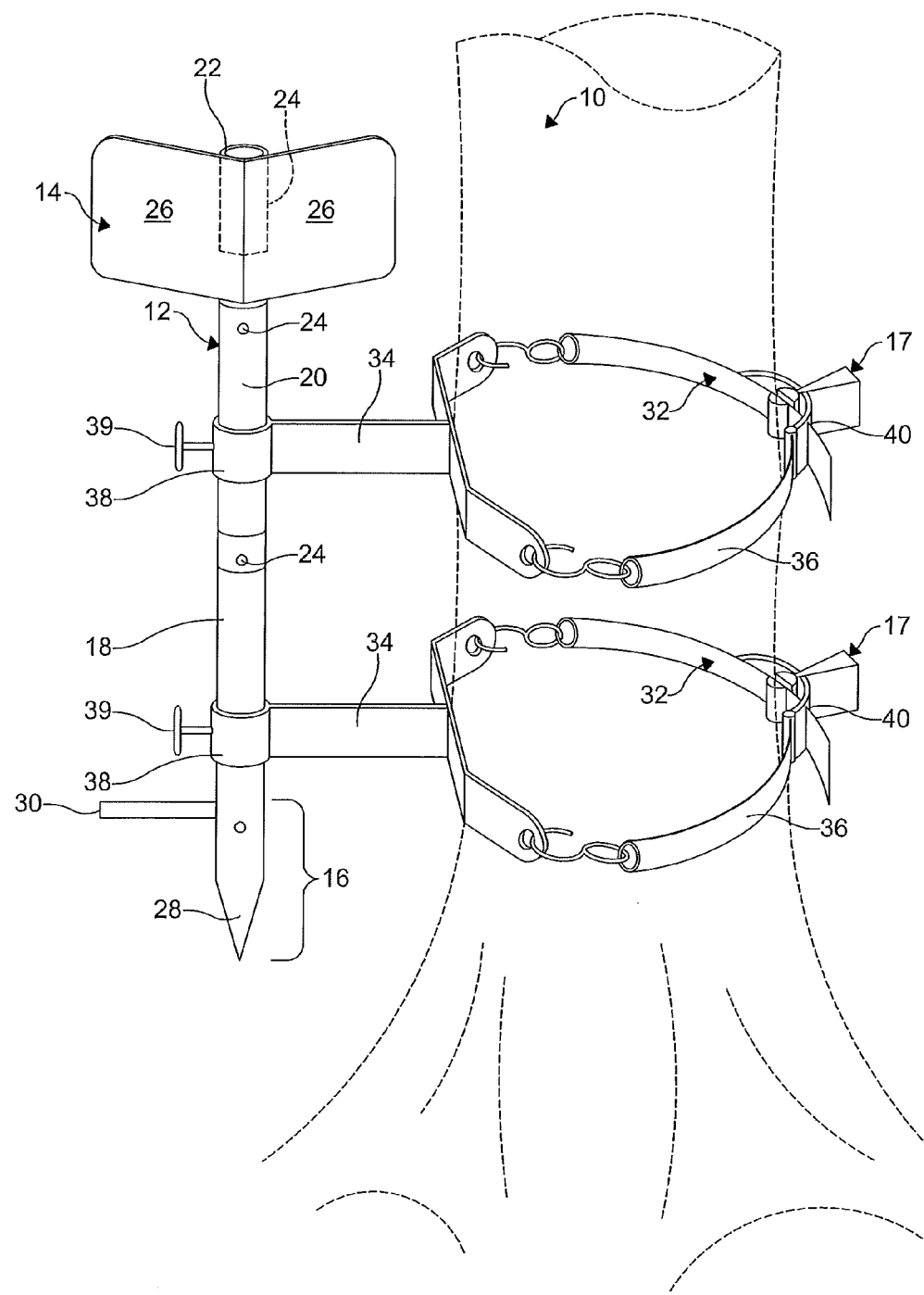
FIG. 4 is a perspective view of the flagpole shown in FIG. 1, and further depicted in use and attached to a tree with brackets and straps.

With renewed reference to FIG. 1, the second securement means 17 can include a pair of harnesses 32 disposed along a length of the main support 12 between a top and a bottom of the main support 12. The harnesses 32 are used anchoring the flagpole 10 to a second anchoring point such as a tree trunk, as shown in FIG. 4, for example.

Each of the harnesses 32 include a bracket 34 for releasably coupling the harness 32 to the main support 12. The brackets 34 serve to space apart the indicator 26 of the flagpole 10 from the tree. For example, the bracket 34 may have an elongate member for spacing apart the harness from the tree. The harnesses 32 may each also have an adjustable band or strap 36 configured for securing the flagpole 10 to the second anchoring point. As used herein, the term "strap" includes elongate belts or bands of flexible material such as nylon, as well as other elongate and flexible members such as rubber belts, chains, ropes, bungee cords, and the like, as non-limiting examples.

The brackets 34 can be coupled to the main support 12 by coupling means 38 such as pins or clamps, for example. In certain embodiments, the coupling means 38 can include an adjustment feature 39 having a hollow body that is slidably disposed on the main support 12. The adjustment feature 39 allows each harness 32 to be selectively positioned along the length of the main support 12. The adjustment feature can include a threaded rod disposed through a threaded hole formed in the coupling means 38, for example, which can selectively impinge upon the second segment 20 or the first segment 18, to selectively affix the coupling means 38 to the main support 12, when the user turns the threaded rod. The adjustment feature 39 may also be provided a knob or handle attached to an end of the threaded rod, for ease in manually turning the threaded rod. Other means for adjusting a position of the brackets 34 along the length of the main support 12 may also be used, as desired.

The strap 36 forms a loop with the bracket 34 and can be adjusted by an adjustment feature 40 to facilitate securing each of the harnesses 32 to second anchoring points of varying sizes, such as trees with varying trunk diameters. The straps 36 may be connected to the brackets 34 by any means desired, for example, hooks as shown in FIGS. 1-2. In non-limiting examples, the adjustment feature 40 can be a buckle, a hook-and-loop system such as Velcro®, a bungee cord, a clasp, a D-ring, a snap, a clamp, a combination thereof, or any other adjustment feature 40 configured to secure the flagpole 10 to the second anchoring point.

Although the second securement means 17 is shown in FIGS. 1-2 and 4 having two harnesses 32, it is understood that the second securement means 17 can include any number of harnesses 32, as desired. For example, one harness or more than two harnesses, to secure the flagpole 10 to the second anchoring point, may be employed within the scope of the present disclosure.

FIG. 6 illustrates an alternate embodiment of the flagpole 10 of the instant disclosure. Like the flagpole 10 illustrated in FIG. 1, the first securement means 16 includes the anchor 28 for penetrating the first anchoring point. The second securement means 17 of the flagpole 10 includes an anchor 42 having a tapered first end 44 or otherwise configured to penetrate the second anchoring point. The anchor 42 is disposed on the main support 12 at a right angle relative thereto.

In certain embodiments, the anchor 42 is dually configured as a foot member for receiving at least the portion of the user's foot. The anchor 42 can further include a plate 46 disposed at a second end 48 thereof and configured to facilitate receiving a force of a device, such as a hammer or mallet, to force the anchor 42 to penetrate the second anchoring point of the three with a device such as a mallet or hammer, or other suitable means.

In a further alternative embodiment, depicted in FIG. 8, the flagpole 10 can include a mount 60. The mount 60 is configured to couple the indicator 14 to the main support 12. The mount 60 includes a channel formed therein for receiving the flags 26. The mount 60 can be provided in a predetermine angle, or can be hinged and moved to any desired angle. The mount 60 can be readily separated from the main body 12 to facilitate collapsibility of the flagpole 10. The mount 60 can also be rotatably attached to the main body 12 to facilitate a pivoting of the indicator 14 in a desired direction. The mount 60 can be rotatably coupled to the main support 12 by any coupling means, within the scope of the present disclosure.

In operation, as assembled, the flagpole 10 can be used by hunters in a field or woods. It is understood the flagpole 10 can be used for other sporting activities, recreational activities, or other activities as desired. The flagpole 10 can be anchored to the first anchoring point or the second anchoring point dependent upon the location of a blind the hunter is using to be camouflaged. For example, if a hunter is camouflaged in a ground blind, then the first securement means 16 can be employed. In this scenario, the hunter can step on the foot member 30 to drive the anchor 28 to penetrate the ground. Likewise, if the hunter is camouflaged in a tree blind, then the second securement means 17 can be employed to secure the flagpole 10 to the second anchoring point.

In the embodiment in which the second securement means 17 includes the harnesses 32, a hunter can adjust the straps 36 and secure the harnesses 32 around the tree trunk where the hunter is located. In the embodiment where the second securement means 17 includes an anchor 42, the hunter can use a forcing device such as a mallet or hammer, for example, to engage with the second end 48 of the anchor 42 or the plate 48 of the anchor 42, to cause the anchor 42 to penetrate the second anchoring point. Once the flagpole 10 is anchored or secured, the flags 26 can be positioned in the partly- or fully-opened position, to advantageously alert others disposed at various distances and locations of the hunter's location.

Advantageously, the flagpole 10 can be readily disassembled and/or collapsed for ease of portability and storage and reassembled once relocated to a different hunting location. The flags 26 of the indicator 14 can be positioned at a parallel position to each other to facilitate storing the flagpole 10. In certain embodiments, components of the first securement means 16 and second securement means 17 (the indicator 14, the anchor 16, the foot member 30, the harnesses 32, the anchor 28, for example) can be decoupled to facilitate disassembly.

As established hereinabove, the flagpole 10 facilitates safety for a hunter when camouflaged. The flagpole 10 is unique in providing dual securement means 16, 17 for selectively securing the flagpole 10 to the ground or the tree, as desired.

It should be appreciated that the flagpole 10 can be packaged and sold together as a customizable kit, for example, as shown in FIG. 2. The main support 12 or segments 18, 20, 22 forming the main support 12, the indicator 14, and securement means 16, 17 can be sold together to enable a user to assemble the flagpole 10 and secure the flagpole 10 to an anchoring point, as desired. Additionally, the coupling means can be included with the kit along with other materials or any other hunting accessory, as desired.

While certain representative embodiments and details have been shown for purposes of illustrating the invention, it will be apparent to those skilled in the art that various changes may be made without departing from the scope of the disclosure, which is further described in the following appended claims.

What is claimed is:

1. A flagpole, comprising:
a main support having an indicator coupled thereto;
first securement means disposed on the main support and configured for anchoring the flagpole to a ground surface; and
second securement means coupled to the main support and configured for anchoring the flagpole to a tree, the second securement means having a bracket with an elongate member configured to space apart the main support from the tree, and the bracket having a first end and a second end, the first end of the bracket selectively slidably coupled with the main body, and the second end of the bracket configured to abut the tree.

2. The flagpole of claim 1, wherein the first securement means is a ground anchor.

3. The flagpole of claim 2, wherein the ground anchor includes a first stake with a tapered end disposed at a bottom of the main support.

4. The flagpole of claim 3, wherein the anchor further includes a second stake with a tapered end, the second stake spaced apart from the first stake.

5. The flagpole of claim 4, wherein the second stake is spaced apart from the first stake with a foot member extending outwardly from the main support and disposed at a right angle relative to the main support.

6. The flagpole of claim 1, wherein the second end of the bracket has a strap configured to removably secure the bracket to the tree.

7. The flagpole of claim 6, wherein the strap forms a loop and can be adjusted in circumference by an adjustment feature to removably secure the harness to the tree.

8. The flagpole of claim 1, wherein the second securement means includes a first bracket and a second bracket, the first bracket spaced apart from the second bracket along a length of the main support.

9. The flagpole of claim 8, wherein each of the first bracket and the second bracket has coupling means configured to slidably couple the bracket to the main support.

10. The flagpole of claim 9, wherein the coupling means has an adjustment feature with a threaded rod disposed through a threaded hole formed in a hollow body of the coupling means, the threaded rod configured to selectively impinge upon the main support when the user rotates the threaded rod.

11. The flagpole of claim 10, wherein the threaded rod has a knob attached to an end thereof, the knob facilitating rotation of the threaded rod by the user.

12. The flagpole of claim 1, wherein the indicator includes a pair of flags selectively positionable at an angle with respect of each other.

13. The flagpole of claim 12, wherein the flags are pivotably connected with a hinge.

14. The flagpole of claim 13, wherein the hinge is attached to the main support.

15. A flagpole, comprising:
a main support having an indicator coupled thereto, wherein the indicator includes a pair of flags selectively positionable at an angle with respect of each other,
first securement means disposed on the main support and configured for anchoring the flagpole to a ground surface, wherein the first securement means is a ground anchor disposed at a bottom of the main support, the ground anchor having a first stake with a tapered end and a second stake with a tapered end with a foot member extending outwardly from the main support and disposed at a right angle relative to the main support, the second stake spaced apart from the first stake; and
second securement means coupled to the main support and configured for anchoring the flagpole to a tree, wherein the second securement means includes a plurality of harnesses, each of the harnesses having a bracket and a strap, the bracket having an elongate member configured to space apart the main support from the tree, and the bracket having a first end and a second end, the first end of the bracket selectively slidably coupled with the main body, and the second end of the bracket configured to abut the tree, and the strap configured to removably secure the bracket to the tree, the strap forming a loop that can be adjusted in circumference by an adjustment feature to removably secure the harness to the tree, and each of the harnesses further having coupling means configured to slidably couple the bracket to the main support.

16. A kit for a flagpole, comprising:
a main support;
an indicator for removably coupling to a top of the main support;
first securement means for removably coupling to a bottom of the main support and configured for anchoring the flagpole to a ground surface upon assembly of the flagpole;
second securement means for removably coupling to the main support at a location between the top and the bottom of the main support, and configured for anchoring the flagpole to a tree upon assembly of the flagpole, the second securement means having a bracket with an elongate member configured to space apart the main support from the tree, and the bracket having a first end and a second end, the first end of the bracket selectively slidably coupled with the main body, and the second end of the bracket configured to abut the tree.

* * * * *